United States Patent
Takeuchi et al.

(10) Patent No.: US 6,558,799 B2
(45) Date of Patent: May 6, 2003

(54) DECORATIVE MATERIAL

(75) Inventors: Hajime Takeuchi, Tokyo-To (JP); Kouji Katou, Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 64 days.

(21) Appl. No.: 09/842,097

(22) Filed: Apr. 26, 2001

(65) Prior Publication Data

US 2001/0049022 A1 Dec. 6, 2001

(30) Foreign Application Priority Data

Apr. 27, 2000 (JP) .................................. 2000-127713

(51) Int. Cl.$^7$ .......................... B32B 27/00; B32B 27/40
(52) U.S. Cl. ................ 428/423.1; 428/424.2; 428/425.3
(58) Field of Search ............. 428/423.1, 425.3, 428/424.2; 528/44, 45, 48, 86, 205, 211; 427/487, 508, 514, 299, 322, 327, 407.1, 408, 409, 411

(56) References Cited

U.S. PATENT DOCUMENTS 5,215,811 A * 6/1993 Reafler et al. .............. 428/212

FOREIGN PATENT DOCUMENTS

| DE | WO 97/33930 | 9/1997 |
| EP | 09078498 | 3/1997 |
| EP | 0 872 338 A1 | 10/1998 |
| GB | 2 164 345 A | 3/1986 |

* cited by examiner

*Primary Examiner*—James J. Seidleck
*Assistant Examiner*—Travis B Ribar
(74) *Attorney, Agent, or Firm*—Parkhurst & Wendel, L.L.P.

(57) ABSTRACT

A decorative material is provided which possesses excellent surface properties, such as excellent staining resistance, marring resistance, scratch resistance, abrasion resistance, and anti-transferability to a cellophane pressure-sensitive adhesive tape, and can be produced at low cost. This decorative material comprises: a substrate having at least on its surface an active hydrogen-containing polar functional group; and, provided on the substrate, a two-component cured urethane resin layer and a surface resin layer of a crosslinked coating formed from a ionizing radiation curable acrylate resin, the two-component cured urethane resin layer having a structure of at least three layers, the crosslinking density of the intermediate layer being lower than that of each layer provided on both sides of the intermediate layer.

10 Claims, 1 Drawing Sheet

DECORATIVE MATERIAL

TECHNICAL FIELD OF THE INVENTION

The present invention relates to a decorative material for use, for example, in surface materials including decorative sheets, such as building interior materials including walls, and surface materials of, for example, fittings, such as doors, and furniture. More particularly, the present invention relates to a decorative material which has a surface resin layer formed from an ionizing radiation curable resin and can realize, at low cost, staining resistance and marring resistance, as well as abrasion resistance, scratch resistance, anti-transferability to a cellophane pressure-sensitive adhesive tape and other surface properties.

PRIOR ART

Abrasion resistance, staining resistance and other surface properties are generally required of decorative materials, such as decorative sheets for use, for example, in interior materials. In order to meet this demand, for example, decorative materials having a surface layer formed from a two-component curable urethane resin is generally used. The use of the two-component curable urethane resin, however, sometimes results in the formation of a surface resin layer possessing unsatisfactory staining resistance and unsatisfactory marring resistance (particularly resistance to scratch of a glossy surface).

Accordingly, a decorative material having a surface layer formed from an ionizing radiation curable resin has also been used, for example, from the viewpoints of higher crosslinking density and higher curing speed as compared with the two-component curable urethane resin. For example, Japanese Patent Publication Nos. 31033/1974 and 22694/1992 disclose a decorative material which has been formed by forming a pattern layer on a substrate by printing, coating an unsaturated polyester, acrylate or other ionizing radiation curable resin coating composition on the surface to form a coating as the outermost surface layer, and then crosslinking and curing the coating by an electron beam to form a surface resin layer. The use of an ionizing radiation curable resin in the formation of the surface layer can more easily provide staining resistance, marring resistance and the like which are unsatisfactory in the case of the two-component curable urethane resin.

Even when the ionizing radiation curable resin is used in the formation of the surface resin layer, better surface properties, for example, in terms of staining resistance, marring resistance, and, in addition, abrasion resistance, scratch resistance, anti-transferability to a cellophane pressure-sensitive adhesive tape are sometimes required. This requirement has been met, for example, by a method (A) wherein spherical particles, such as spherical α-alumina, is added to the ionizing radiation curable resin coating composition for the surface layer (see Japanese Patent No. 2740943), or by a method (B) wherein, when the substrate is paper, a resin impregnated paper with an acrylic resin, rubber latex or the like being impregnated thereinto is provided and a pattern layer is printed on this substrate.

The decorative materials produced by the methods (A) and (B) certainly have improved surface properties. Since, however, special materials are used, the production cost is so high that the applications of these decorative materials are disadvantageously limited. An attempt to form the surface resin layer from the two-component curable urethane resin instead of the ionizing radiation curable resin from the viewpoint of the cost has in many cases resulted in unsatisfactory surface properties, particularly unsatisfactory staining resistance and marring resistance.

For this reason, the development of a decorative material, which can be produced at low cost and, at the same time, possesses excellent surface properties such as excellent staining resistance, marring resistance, abrasion resistance, scratch resistance, and anti-transferability to a cellophane pressure-sensitive adhesive tape, has been desired in the art.

SUMMARY OF THE INVENTION

In order to solve the above problems of the prior art, according to the present invention, there is provided a decorative material comprising: a substrate having at least on its surface an active hydrogen-containing polar functional group; and, provided on the substrate, a two-component cured urethane resin layer and a surface resin layer of a crosslinked coating formed from a ionizing radiation curable acrylate resin, said two-component cured urethane resin layer having a structure of at least three layers of a first resin layer, a second resin layer, and a third resin layer provided in that order from the substrate side, the crosslinking density of the second resin layer being lower than that of the first resin layer and that of the third resin layer.

By virtue of the above construction, the decorative material according to the present invention can realize low cost and, at the same time, excellent surface properties such as excellent staining resistance, marring resistance, scratch resistance, abrasion resistance, and anti-transferability to a cellophane pressure-sensitive adhesive tape. These excellent properties of the decorative material according to the present invention are considered attributable to the following reasons.

(1) When the two-component curable urethane resin cure, the active hydrogen-containing polar functional group present on the surface of the substrate is chemically reacted with an isocyanate component in the two-component curable urethane resin to form a chemical bond which can improve the adhesion of the substrate to a layer formed from the two-component curable urethane resin.

(2) The adoption of an acrylic resin as the ionizing radiation curable resin permits a resin material, which can cope with required properties, to be easily available at relatively low cost.

(3) The adhesion between the two-component cured urethane resin layer and the substrate and the adhesion between the two-component cured urethane resin layer and the surface resin layer can be improved, and the modulus of elasticity can be lowered by the second resin layer having relatively low crosslinking density to improve the marring resistance, the scratch resistance, and abrasion resistance.

(4) Even though a contaminant, such as a dye, has penetrated the interior of the assembly without being fully blocked by the surface resin layer, the portion having relatively high crosslinking density (third resin layer) can receive the contaminant and thus can prevent further penetration and can improve the staining resistance.

In the decorative material having the above construction according to the present invention, preferably, the polyol component for the formation of the two-component cured urethane resin layer is a two-component system of an unsaturated polyester polyol and a saturated polyester elastomer polyol.

The use of the specific polyol component in the formation of the two-component cured urethane resin layer can easily improve the modulus of elasticity of the two-component cured urethane resin layer, and, in addition, can further improve the adhesion between the two-component cured urethane resin and the surface resin layer. This is considered attributable to the fact that the unsaturated polyester polyol contained in the polyol component takes part in a crosslinking reaction with the ionizing radiation curable acrylate resin at the time of the formation of the surface resin layer, and, thus, the resultant chemical bond can provide intimate adhesion between the surface resin layer and the two-component cured urethane resin layer. Another reason of improved adhesion is considered that the saturated polyester elastomer polyol having a soft segment give the modulus of elasticity to the two-component cured urethane resin layer.

Further, in any one of the above constructions in the decorative material according to the present invention, preferably, the ionizing radiation curable resin for the surface resin layer further contains silicone (meth)acrylate.

This construction can surely realize better anti-transferability to a cellophane pressure-sensitive adhesive tape and abrasion resistance as compared with the use of conventional lubricants such as silicone resin.

DESCRIPTION OF THE PREFERRED EMBODIMENTS

Preferred embodiments of the decorative material according to the present invention will be described with reference to the accompanying drawing.

Figure 1:
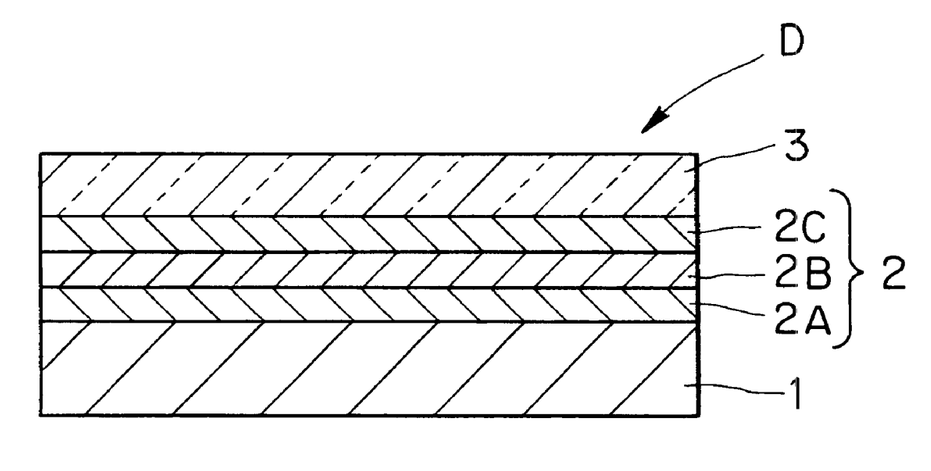
FIG. 1 is a cross-sectional view showing an embodiment of the decorative material according to the present invention.

FIG. 1 is a cross-sectional view showing one embodiment of the decorative material according to the present invention. A decorative material D according to the present invention comprises: a substrate 1 having at least on its surface an active hydrogen-containing polar functional group; and, provided on the substrate, a two-component cured urethane resin layer 2 and a surface resin layer 3 of a crosslinked coating formed from a ionizing radiation curable acrylate resin. The two-component cured urethane resin layer has a three-layer structure of a first resin layer 2A, a second resin layer 2B, and a third resin layer 2C provided in that order from the substrate side.

For example, a decorative layer for representing, for example, a printed pattern may be additionally provided.

At least one of the at least three layers constituting the two-component cured urethane resin layer may function as a decorative layer. For example, a construction may be adopted such that the first resin layer is a colored solid layer and the second resin layer is a pattern layer, that is, the first and second resin layers may be a decorative layer. Thus, when the two-component cured urethane resin layer has other function, for example, can function as a decorative layer, this is advantageous also in cost. Further, when the substrate is a penetrable substrate, such as paper, a sealer layer may be additionally provided as a layer which has other function. In this case, alternatively, the function of a sealer layer may be imparted to any one layer constituting the two-component cured urethane resin layer, for example, the first resin layer.

In the present invention, the "layer" may not be necessarily continuous, and may be discontinuous so far as the effect of the present invention is not sacrificed. Specifically, the layer may be in a network or pattern form having openings.

According to the present invention, the provision of a two-component cured urethane resin layer between the surface resin layer formed from an ionizing radiation curable acrylate resin and the substrate having at least on its surface an active hydrogen-containing polar functional group can impart, to the decorative material, excellent surface properties which cannot be realized by the sole use of the surface resin layer formed from the ionizing radiation curable resin. More specifically, all the excellent staining resistance, marring resistance, scratch resistance, abrasion resistance, and anti-transferability to a cellophane pressure-sensitive adhesive tape can be simultaneously realized. This is considered attributable to an improvement in adhesion, between the surface resin layer and the substrate, which is a basic properties required in these surface properties. Specifically, the active hydrogen-containing polar functional group (for example, a hydroxyl group) present on the surface of the substrate is chemically reacted with the isocyanate component at the time of curing of the two-component curable urethane resin to improve the adhesion between the substrate and the two-component cured urethane resin layer. The adoption of the ionizing radiation curable acrylate resin enables various resin materials, which cope with various surface properties, to be available at relatively low cost. In addition, particularly when the unsaturated polyol is used as the polyol component in the two-component curable urethane resin used for the formation of the two-component cured urethane resin layer, the polyol can easily take part in a curing reaction of the surface resin layer to improve the adhesion between the surface resin layer and the two-component cured urethane resin layer.

Better properties can be realized when the two-component cured urethane resin layer 2 has a three-layer structure of a first resin layer 2A having relatively high crosslinking density, a second resin layer 2B having relatively low crosslinking density, and a third resin layer 2C having relatively high crosslinking density.

The first resin layer 2A in contact with the substrate has relatively high crosslinking density, and thus is advantageous in adhesion to the substrate. The third resin layer 2C in contact with the surface resin layer has relatively high crosslinking density, and thus is also advantageous in adhesion to the surface resin layer. In this connection, it should be noted that, when all the layers constituting the two-component cured urethane resin layer have high crosslinking density, the effect of improving surface properties, of the overlying surface resin layer formed from the ionizing radiation curable resin, such as scratch resistance and marring resistance, is sometimes unsatisfactory. Accordingly, in the decorative material of the present invention, the second resin layer 2B having relatively low crosslinking density is provided as an intermediate layer of the two-component cured urethane resin layer 2 to further improve surface properties such as scratch resistance and marring resistance.

In the present invention, the crosslinking density of the first resin layer 2A, the second resin layer 2B, and the third resin layer 2C is relatively defined. The first resin layer 2A has higher crosslinking density than the second resin layer 2B, and the third resin layer 2C has higher crosslinking density than the second resin layer 2B. Thus, both the first resin layer 2A and the third resin layer 2C have higher crosslinking density than the second resin layer 2B. So far as this requirement is met, the relationship between the crosslinking density of the first resin layer 2A and the crosslinking density of the third resin layer 2C is not critical, and there may be a difference or no difference in crosslinking density between the first resin layer 2A and the third resin layer 2C.

Each layer will be described in more detail.
[Substrate]
The material for the substrate 1 is not particularly limited, so far as the material has at least on its surface an active hydrogen-containing polar functional group. The substrate may be in any form of, for example, a sheet, a plate, or an three-dimensional object depending upon the applications of decorative materials. Examples of active hydrogen-containing polar functional groups include hydroxyl, carboxyl, and amino groups.

For example, sheet materials include: paper, such as tissue paper, kraft paper, titanium paper, linter paper, paperboard, wood free paper, coated paper, art paper, parchment paper, glassine paper, and paraffin paper; films (sheets) of polyolefin resins, such as polyethylene, polypropylene, polybutene, ethylene-propylene copolymer, and olefin thermoplastic elastomer, vinyl resins, such as polyvinyl chloride, polyvinylidene chloride, and polyvinyl alcohol, polyester resins, such as polyethylene terephthalate, polybutylene terephthalate, and polyester thermoplastic elastomer, acrylic resins, such as polymethyl (meth)acrylate, polyethyl (meth)acrylate, and polybutyl (meth)acrylate (the term "(meth)acryl" used herein referring to "acryl" or "methacryl"), and other resins, such as polystyrene, acrylonitrile-butadiene-styrene copolymer (ABS resin), cellulose triacetate, cellophane, and polycarbonate; and foils of metals, such as aluminum, iron, stainless steel, and copper.

Examples of plate or board materials include: woody plates, for example, wood venners, ply woods, particle boards, and medium-density fiber boards (MDFS) of woods, such as cedar, pine, zelkova, oak, lauan, teak, melapi, and bamboo (in the present invention, bamboo is embraced in the category of woods); inorganic, nonmetallic plates, for example, plaster boards, gypsum slag boards, calcium silicate boards, asbestos slate boards, cement boards, such as ALC (lightweight cellular concrete) boards and hollow extruded cement boards, pulp cement flat plates, asbestos cement boards, wood chip cement boards, GRC (glass fiber reinforced concrete) boards, and ceramic boards of potteries, porcelains, stonewares, earthenwares, glasses, enamels and the like; and metallic plates, for example, iron plates, galvanized steel plates, polyvinyl chloride sol-coated steel plates, aluminum plates, and copper plates; thermoplastic resin plates of, for example, polyolefin resins, such as polyethylene, polypropylene, polybutene, ethylene-propylene copolymer, and olefin thermoplastic elastomers, acrylic resins, such as polymethyl (meth)acrylate, polyethyl (meth)acrylate, and polybutyl (meth)acrylate, and other thermoplastic resins, such as polyvinyl chloride, polystyrene, acrylonitrile-butadiene-styrene copolymer (ABS resin), and polycarbonate; thermoset resin plates produced from thermosetting resins, such as phenolic resin, urea resin, unsaturated polyester resin, urethane resin, epoxy resin, and melamine resin; and other resin plates, such as the so-called "FRP" (fiber reinforced plastics) plate, produced by impregnating a nonwoven fabric of glass fiber, a woven fabric, paper, or other various fiber substrate with a resin, such as phenolic resin, urea resin, unsaturated polyester resin, urethane resin, epoxy resin, melamine resin, or diallyl phthalate resin, and then curing the impregnated material to form a composite plate.

Examples of three-dimensional objects include columnar objects or other three-dimensional objects of various materials recited above in connection with the plate or board materials. More specific examples thereof include columnar woods and resin molded products as three-dimensional objects.

For example, in the case of paper and wood materials, the cellulose fiber has hydroxyl groups in its molecule per se. On the other hand, in the case of materials not having any hydroxyl group on their surface, these materials may be subjected to corona discharge treatment, ozone treatment, plasma treatment or the like to impart an active hydrogen-containing polar functional group, such as a hydroxyl group, to the surface of the material, or alternatively, a resin having an active hydrogen-containing functional group in its molecule, such as an acrylic polyol, may be coated as a primer layer. The materials after these treatments may be used as the substrate according to the present invention.

In the decorative material according to the present invention, a construction may be adopted wherein the two-component cured urethane resin layer may function also as a sealer layer. Therefore, in the case of penetrable substrates, for example, paper, satisfactory properties can be provided without use of expensive paper materials, such as resin impregnated paper. In this case, the function of the sealer layer may be imparted to at least one of the first resin layer, the second resin layer, and the third resin layer, for example, the first resin layer in contact with the paper substrate. Consequently, in the case of a paper substrate, the decorative material according to the present invention can be provided as a decorative paper possessing the above-described various surface properties which could have been realized at low cost.

The decorative material is a decorative sheet when the substrate is a sheet; is a decorative plate when the substrate is a plate; and is decorative member or decorative product when the substrate is a three-dimensional object.

[Two-Component Cured Urethane Resin Layer]
The first resin layer 2A, the second resin layer 2B, and the third resin layer 2C constituting the two-component cured urethane resin layer 2 each are a layer comprising a two-component cured urethane resin. Two-component curable urethane resin for the two-component cured urethane resin may be basically selected from conventional resin materials according to applications, required properties and the like.

The relationship between the crosslinking density of the three layers, the first resin layer, the second resin layer, and the third resin layer, and the mechanical properties is shown in Table 1.

TABLE 1

Relationship between crosslinking density of first, second and third resin layers and mechanical properties

| | Crosslinking density | Elastic limit | Modulus of elasticity | Elongation |
|---|---|---|---|---|
| 1st resin layer | High | High | High | Low |
| 2nd resin layer | Low | Low | Low | High |
| 3rd resin layer | High | High | High | Low |

As shown in Table 1, the second resin layer having relatively low crosslinking density has relatively low elastic limit, relatively low modulus of elasticity, and relatively high elongation. On the other hand, the first resin layer and the third resin layer each having relatively high crosslinking density have relatively high elastic limit, relatively high modulus of elasticity, and relatively low elongation. Consequently, it is considered that the two-component cured urethane resin layer underlying the surface resin layer can have improved adhesion while maintaining suitable modulus of elasticity.

When a desired design can be expressed by the two layers of the substrate and the surface resin layer, the two-component cured urethane resin layer having a three-layer structure may be formed as a simple uncolored transparent resin layer not containing, for example, a colorant. These layers, however, may have other functions such as decoration.

For example, the first resin layer in contact with the substrate may function also as a sealer layer for sealing or penetration preventive purposes when the substrate is formed of a material having a rough or penetrable surface, such as paper or wood. However, the first resin layer basically has the function of enhancing the adhesion to the substrate. Further, in the first resin layer, a colorant may be added so that the first resin layer can function also, for example, as a colored layer, an opacifying layer, or a colored, opacifying layer.

In the second resin layer as the intermediate layer of the two-component cured urethane resin layer, a construction may be adopted wherein a colorant may be added followed by patterning of the layer so that the second resin layer functions also as a decorative layer. When the layer is patterned, a relatively continuous layer rather than a scattered layer is preferred from the viewpoint of satisfactorily attaining the effect of the present invention. Further, when the formation of the second resin layer as a multi-color decorative layer by printing of a plurality of resin coating compositions of different colors is contemplated, a construction may be adopted wherein, even in the case where each color pattern is scattered, overlapping the plurality of color patterns results in the formation of a resin layer which, as a whole, covers substantially the whole area of the first resin layer without being scattered on the first resin layer.

The third resin layer in contact with the surface resin layer basically has the function of enhancing the adhesion to the surface resin layer. Further, since the crosslinking density is relatively high, regarding the staining resistance, the third resin layer has the function of inhibiting the penetration of a contaminant into a layer(s) underlying the surface resin layer, that is, functions also as a contaminant penetration preventive layer. A colorant may also be added to the third resin layer.

The crosslinking density of the two-component urethane resin layer may be regulated by properly regulating, for example, the amount of the isocyanate added, the molecular weight of the polyol, and the number of functional groups in one molecule of the polyol and the isocyanate.

In general, the crosslinking density increases with increasing the amount of the isocyanate added. Further, in general, the crosslinking density increases with decreasing the molecular weight of the polyol. Furthermore, in general, the crosslinking density increases with increasing the number of functional groups in one molecule of the polyol and the isocyanate. As is apparent from Table 1, the higher the crosslinking density, the higher the elastic limit and the modulus of elasticity and the lower the elongation and, consequently, the better the staining resistance.

The two-component curable urethane resin is a urethane resin using a polyol as a main agent and an isocyanate as a crosslinking agent (a curing agent). Polyethylene glycol, polypropylene glycol, acryl polyol, polyester polyol, polyether polyol, polycarbonate polyol, polyurethane polyol and the like are generally used as the polyol component. On the other hand, a polyisocyanate having two or more isocyanate groups in its molecule may be generally used as the isocyanate component, and examples thereof include aromatic isocyanates, such as 2,4-tolylene diisocyanate, xylene diisocyanate, naphthalene diisocyanate, and 4,4'-diphenylmethane diisocyanate, and aliphatic (or alicyclic) isocyanates, such as 1,6-hexamethylene diisocyanate, isophorone diisocyanate, hydrogenated tolylene diisocyanate, and hydrogenated diphenylmethane diisocyanate. Further, adducts or multimers of the above-described various isocyanates may also be used. For example, an adduct of tolylene diisocyanate and a trimer of tolylene diisocyanate may be used. Among the above isocyanates, aliphatic (or alicyclic) isocyanates can also improve weathering resistance and heat yellowing resistance and hence are preferred. Specifically, for example, hexamethylene diisocyanate is preferred.

Any polyol exemplified above may be used as the polyol. However, the polyester elastomer polyol, especially saturated polyester elastomer polyol, is particularly preferred from the viewpoints of adhesion and elasticity. The polyester elastomer polyol is a kind of polyester polyol, that is, a polyester polyol having in its molecule a soft segment and a hard segment. Here soft segments usable herein include aliphatic polyethers, such as tetramethylene glycol, and aliphatic polyesters, and hard segments usable herein include polybutylene terephthalate. This polyester elastomer polyol can easily impart a suitable level of elastic element necessary for surface properties, particularly scratch resistance, marring resistance and the like, to the two-component cured urethane resin layer.

A polyol having not only a hydroxyl group but also a functional group involved in the polymerization of the ionizing radiation curable resin, such as a radically polymerizable unsaturated group, is more preferred from the viewpoint of the adhesion to the surface resin layer formed from the ionizing radiation curable acrylate resin. For example, unsaturated polyester polyols may be mentioned as the polyol having not only a hydroxyl group but also a radically polymerizable unsaturated group. The unsaturated polyester polyol is a polyol which has on its main chain a plurality of ester bonds and has in its molecule not only a hydroxyl group but also a polymerizable unsaturated group such as an ethylene group. Such unsaturated polyester polyols include, for example, unsaturated polyester resins having a hydroxyl group, for example, at the end. Particularly preferably, this unsaturated polyester polyol and the above-described (saturated) polyester elastomer polyol are used in combination. At that time, the mixing ratio may be properly regulated. The unsaturated polyester polyol: polyester elastomer polyol is generally 10:90 to 90:10 (mass ratio).

The use of the combination of the unsaturated polyol with the elastomer polyol in a layer in direct contact with the surface resin layer (that is, the third resin layer) among the layers constituting the two-component cured urethane resin layer is effective because the participation in the curing reaction of the surface resin layer is large. When the migration of molecules caused by the diffusion in layers, the mutual dissolution of layers and the like in the course of the formation of the coating are taken into consideration, however, a suitable effect can be often attained by incorporating the above combination, for example, into the first resin layer or the second resin layer without the necessity of the incorporation of the above combination into the layer in contact with the surface resin layer. Further, in some cases, the first resin layer and the second resin layer are partly brought into direct contact with the surface resin layer. For example, when the third resin layer is not formed over the whole area of the second resin layer (for example, when the third resin layer is formed as a dot pattern layer), the second resin layer comes into direct contact with the surface resin layer at opening portions of the third resin layer. In this case, the use of the combination of the unsaturated polyol with the elastomer polymer in the second resin layer is effective.

The function of each resin layer in the two-component cured urethane resin layer 2 will be futher described. The first resin layer 2A having high crosslinking density is linked through a urethane bond to the active hydrogen-containing polar functional group on the surface of the substrate. This contributes to improved adhesion of the two-component cured urethane resin layer 2 to the substrate. This tendency is significant when the amount of the isocyanate incorporated is large. The second resin layer 2B having low crosslinking density functions to lower the elastic limit and the modulus of elasticity and to increase the elongation. Here the abrasive force can be relaxed and dispersed and absorbed, and this can improve the abrasion resistance, the scratch resistance, and the marring resistance. The third resin layer 2C having high crosslinking density can improve the adhesion to the surface resin layer formed of the ionizing radiation cured acrylate resin. This tendency is significant when the unsaturated polyester polyol is used. When the (saturated) polyester elastomer polyol is used, the elongation is lowered, while when the amount of the isocyanate added is increased, the elastic limit and the modulus of elasticity are enhanced. By virtue of these effects, the third resin layer has a hardness intermediate between the hardness of the surface resin layer and the hardness of the second resin layer. In this case, as compared with the case where the second resin layer is in direct contact with the surface resin layer, the stress concentration is reduced, and the abrasion force conveyed to the second resin layer is reduced. Thus, preferably, the hardness of the third resin layer is made lower than that of the surface resin layer.

The layers constituting the two-component curable urethane resin layer may be formed by a conventional coating or printing method depending upon whether the layer is formed over the whole area or formed in a desired pattern form. For example, when the layer is formed over the whole area, a coating method such as gravure coating or roll coating may be used. On the other hand, when the formation of the layer in a pattern form is contemplated, the use of a printing method such as gravure printing, silk screen printing, offset printing, or gravure offset printing may be used. The thickness of each of the first to third resin layers constituting the two-component cured urethane resin layer is generally about 1 to 5 μm.

When a colorant is added to the two-component cured urethane resin layer to form a decorative layer or the like, conventional colorants may be used as the colorant. Examples of colorants usable herein include: inorganic pigments, such as titanium white, carbon black, red oxide, chrome yellow, and ultramarine blue; organic pigments, such as aniline black, quinacridone red, isoindolinone yellow, and phthalocyanine blue; luster pigments, for example, titanium dioxide-covered mica and foils and powders of aluminum or the like; and dyes.

When a colorant is added to the two-component cured urethane resin layer to form a decorative layer representing a pattern, the pattern may be any one, and examples thereof include woodgrain patterns, rift patterns, texture pattern, a tile-like pattern, a brick-like pattern, a leather-like crepe pattern, characters, or a geometrical pattern.

Conventional additives, for example, extender pigments, such as silica and calcium carbonate, ultraviolet absorbers, and stabilizers, may be added to the two-component cured urethane resin layer to properly regulate, for example, suitability for coating, suitability for printing, or mechanical properties.

[Surface Resin Layer]

The surface resin layer 3 is the outermost surface layer of the decorative material, and may be formed by crosslinking an ionizing radiation curable acrylate resin to form a layer. The surface resin layer may be formed by coating the ionizing radiation curable resin (composition), which has been brought to a liquid state, for example, by gravure coating or roll coating, and then applying an ionizing radiation to the coating to crosslink and cure the coating. Alternatively, the coating may be formed by full solid printing, for example, by gravure printing. The thickness of the surface resin layer is generally about 1 to 30 μm.

Basically, various ionizing radiation curable resins may be used for the surface resin layer. Specifically, the ionizing radiation curable resin is preferably an ionizing radiation crosslinkable, curable composition prepared by properly mixing a prepolymer (including the so-called "oligomer") having in its molecule a radically polymerizable unsaturated bond or a cationically polymerizable functional group and/or a monomer having in its molecule a radically polymerizable unsaturated bond or a cationically polymerizable functional group. Examples of such ionizing radiation curable resins include acrylate, epoxy, and polyene/thiol resins.

The term "ionizing radiation" used herein refers to electromagnetic waves or charged particles having energy which can polymerize or crosslink the molecule, and electron beam (EB) or ultraviolet light (UV) is generally used.

The prepolymer or monomer specifically comprises a compound having in its molecule, for example, a radically polymerizable unsaturated group, such as an (meth)acryloyl or (meth)acryloyloxy group, or a cationically polymerizable functional group, such as an epoxy group. These prepolymers and monomers may be used alone or as a mixture of two or more. Here, for example, the (meth)acryloyl group refers to an acryloyl or methacryloyl group.

Examples of acrylate prepolymers having a radically polymerizable unsaturated group in the molecule thereof include polyester (meth)acrylate, urethane (meth)acrylate, epoxy (meth)acrylate, melamine (meth)acrylate, and triazine (meth)acrylate. The molecular weight of the prepolymer is generally about 250 to 100,000.

Examples of acrylate monomers having a radically polymerizable unsaturated group in the molecule thereof include: acrylate monofunctional monomers, such as methyl (meth)acrylate, 2-ethylhexyl (meth)acrylate, and phenoxyethyl (meth)acrylate; and acrylate polyfunctional monomers, such as diethylene glycol di(meth)acrylate, propylene glycol di(meth)acrylate, trimethylolpropane tri(meth)acrylate, trimethylolpropane ethylene oxide tri(meth)acrylate, dipentaerythritol tetra(meth)acrylate, dipentaerythritol penta (meth)acrylate, and dipentaerythritol hexa(meth)acrylate.

Particularly preferred is an ionizing radiation curable resin comprising an acrylate containing in its molecule (meth)acryloyl, (meth)acryloyloxy or other group. In the case of this resin, resin materials according to the required surface properties are easily available at relatively low cost. When an unsaturated polyester polyol, which additionally has a radically polymerizable unsaturated group, is used as a polyol for the two-component cured urethane resin layer, the unsaturated group takes part in the crosslinking reaction of the ionizing radiation curable acrylate resin at the time of the formation of the surface resin layer, whereby the surface resin layer is strongly linked through a chemical bond to the two-component cured urethane resin layer to improve the adhesion between these two layers. Specific examples of ionizing radiation curable resins, which are preferred from the viewpoints of surface properties and cost, include a mixed resin composed of a di- or trifunctional polyester (meth)acrylate prepolymer, a tri- or tetrafunctional (meth)acrylate monomer, and a properly ethylene oxide-modified trimethylolpropane tri(meth)acrylate.

When the ionizing radiation curable resin is crosslinked by the application of ultraviolet light, a photopolymerization initiator is further added to the ionizing radiation curable resin. Since the ionizing radiation curable acrylate resin is generally cured by radical polymerization, acetophenones, benzophenones, thioxanthones, benzoin, and benzoin methyl ethers are generally used as the photopolymerization initiator either solely or as a mixture of two or more. The amount of the photopolymerization initiator added is generally about 0.1 to 10 parts by mass based on 100 parts by weight of the ionizing radiation curable resin.

If necessary, other various additives may be further added to the ionizing radiation curable resin. Additives usable herein include, for example, thermoplastic resins, such as vinyl chloride-vinyl acetate copolymer, vinyl acetate resin, acrylic resin, and cellulosic resin, extender pigments (fillers) in a fine powder form, such as calcium carbonate, barium sulfate, and antifriction materials described later, lubricants, such as silicone resin and wax, and colorants, such as dyes and pigments.

Silicone (meth)methacrylate is a particularly preferred lubricant because stable and excellent anti-transferability to a cellophane pressure-sensitive adhesive tape can be realized. On the other hand, when other silicone resin or the like is used as the lubricant, care should be taken because the dispersion within the surface resin layer is unstable and, thus, stable properties cannot be sometimes provided. The amount of silicone (meth)acrylate added is generally about 0.1 to 5 parts by mass based on 100 parts by mass of the resin.

The antifriction material is optionally added to further improve the abrasion resistance. Antifriction materials usable herein include hard inorganic particles. Inorganic particles include particles of alumina such as α-alumina, silica, glass, silicon carbide, and diamond. The inorganic particles may be generally spherical, polyhedron, flaky, or irregular. The shape of the inorganic particles, however, is not limited to these only. The average diameter of the inorganic particles is preferably about 3 to 30 μm from the viewpoints of improved abrasion resistance and smoothness. The amount of the inorganic particles added is about 5 to 30% by mass based on the total amount of the resin component.

When ultraviolet light is used to cure the surface resin layer, for example, ultrahigh pressure mercury lamps, high pressure mercury lamps, low pressure mercury lamps, carbon arc lamps, black light lamps, and metal halide lamps are generally used as ultraviolet sources. The wavelength of the ultraviolet light used is generally in the range of 190 to 380 nm.

When electron beams are used to cure the surface resin layer, electron beam sources include those which can apply electrons having an energy of 100 to 1000 keV, preferably 200 to 390 keV, for example, various electron beam accelerators, such as Cockcroft-Walton accelerators, van de Graaff accelerators, resonance transformers, insulated core transformers, linear, dynamitron, and high-frequency electron accelerators.

[Substrate as Adherend]

The decorative material according to the present invention may be generally applied as a surface decorative material onto the surface of various substrates as the adherend particularly when the decorative material is in the form of decorative sheets such as decorative paper.

The substrate as the adherend is not particularly limited. Examples of substrates as the adherend include inorganic nonmetallic, metallic, wood-based, and plastic substrates. More specifically, inorganic nonmetallic substrates include those formed of inorganic materials, for example, non-clay ceramic materials, such as sheet-forming cement, extrusion cement, slag cement, ALC (lightweight cellular concrete), GRC (glass fiber-reinforced concrete), pulp cement, wood chip cement, asbestos cement, calcium silicate, gypsum, and gypsum slag, and ceramics, such as earthenware, pottery, porcelain, stoneware, glass, and enamel. Metallic substrates include, for example, those formed of metal materials, for example, iron, aluminum, and copper. Wood-based substrates include, for example, veneer, ply wood, particle board, fiber sheet or plate, and laminated wood of cedar, cypress, oak, lauan, teak and the like. Plastic substrates include, for example, those formed of resin materials, such as polypropylene, ABS resin, and phenolic resin. The substrate may have any shape, for example, may be in the form of a flat plate, a curved plate, or a polygonal column.

[Applications]

The decorative material according to the present invention may be used in any applications without particular limitation, and, for example, may be used in building interior materials, such as wall, floor or ceiling, fittings, such as doors, door frames, or sashes, fixture members, such as verandahes or baseboards, and furniture, such as chest of drawers or cabinets.

The following examples and comparative examples further illustrate the present invention.

EXAMPLE 1

A decorative material D having a construction as shown in FIG. 1 was prepared as a decorative paper according to the following procedure. A tissue paper having a basis weight of 30 g/m² for building materials consisting of cellulose pulp was first provided as a substrate 1 having on its surface hydroxyl groups as an active hydrogen-containing polar functional group. On one side of the substrate 1 were formed an uncured layer for a first resin layer 2A having high crosslinking density, an uncured layer for a second resin layer 2B having low crosslinking density, and an uncured layer for a third resin layer 2C having high crosslinking density in that order by coating. These uncured layers were heat cured and crosslinked to form the first resin layer 2A, the second resin layer 2B, and the third resin layer 2C which constitute a two-component cured urethane resin layer 2. A surface resin layer 3 formed of a crosslinked coating produced from an ionizing radiation curable acrylate resin was then formed on the two-component cured urethane resin layer 2. Thus, the decorative material D was prepared.

Among the three layers constituting the two-component cured urethane resin layer 2, the first resin layer 2A was formed as follows. A main agent (100 parts by mass) composed of an unsaturated polyester polyol (component A) and a (saturated) polyester elastomer polyol (component B) in a mass ratio of 5:5 was mixed with 3 parts by mass (3% by mass) of 1,6-hexamethylene diisocyanate as a crosslinking agent to prepare a two-component curable urethane resin composition. Titanium oxide (25 parts by mass) was added to 10 parts by mass of the composition to prepare a coating liquid. This coating liquid was gravure coated at a coverage of 3 g/m² (on a solid basis; the same shall apply hereinafter) over the whole area of the substrate to form an uncured coating (an uncured layer).

The second resin layer 2B was formed as follows. A main agent (10 parts by mass) composed of an unsaturated polyester polyol (component A) and a (saturated) polyester elastomer polyol (component B) in a mass ratio of 5:5 was mixed with 5 parts by mass of carbon black to prepare a coating liquid. This coating liquid was gravure coated at a coverage of 2 g/m² over the whole area. The coating liquid for the second resin layer is free from any isocyanate component. In the formation of the second resin layer 2B, the isocyanate component necessary for the second resin layer 2B was entirely supplied by the migration or diffusion from the uncured layer for the first resin layer and the uncured layer for the third resin layer. Specifically, when these layers are stacked on top of one another, mutual dissolution of adjacent layers takes place through the solvent contained in the coating liquid to cause the migration or diffusion of the isocyanate molecule. In this case, the isocyanate was added to the second resin layer in a relatively smaller amount than the amount of the isocyanate added to the first and third resin layers to lower the crosslinking density of the second resin layer.

The third resin layer 2C was formed as follows. A main agent (100 parts by mass) composed of an unsaturated polyester polyol (component A) and a (saturated) polyester elastomer polyol (component B) in a mass ratio of 5:5 was mixed with 3 parts by mass (3% by mass) of 1,6-hexamethylene diisocyanate as a crosslinking agent to prepare a coating liquid of a two-component curable urethane resin. This coating liquid was gravure coated at a coverage of 3 g/m² over the whole area to form an uncured coating (an uncured layer).

The surface resin layer 3 formed of a crosslinked coating of an ionizing radiation curable acrylate resin was formed as follows. A trifunctional polyester acrylate prepolymer (41 parts by mass), 40 parts by mass of trimethylolpropane triacrylate, 18 parts by weight of pentaerythritol hexaacrylate, and 1 part by mass of silicone acrylate were mixed together to prepare an ionizing radiation (electron beam) curable acrylate resin coating composition. This coating composition was coated at a coverage of 5 g/m² by a gravure offset method, and the coating was exposed to an electron beam under conditions of 175 kev and 30 kGy (3 Mrad) to crosslink and cure the coating. Thus, the surface resin layer 3 of a crosslinked coating was formed.

The details of the resin for the first resin layer, the resin for the second resin layer, and the resin for the third resin layer together with other examples and comparative examples are summarized in Table 2.

EXAMPLES 2 TO 9

The procedure of Example 1 was repeated, except that the resin for the first resin layer, the resin for the second resin layer, and the resin for the third resin layer in Example 1 were changed as shown in Table 2. Thus, decorative materials of Examples 2 to 9 were prepared.

EXAMPLE 10

The procedure of Example 1 was repeated, except that the substrate in Example 1 was changed to a 100 μm-thick polypropylene film which had been subjected to corona discharge treatment to introduce hydroxyl groups into the surface of the film. thus, a decorative material of Example 10 was prepared.

COMPARATIVE EXAMPLE 1

The procedure of Example 1 was repeated, except that the resin for the first resin layer, the resin for the second resin layer, and the resin for the third resin layer in Example 1 were changed as shown in Table 2, that is, the first and third resin layers were two-component cured urethane resin layers and the second resin layer was a thermoplastic resin layer. Thus, a decorative material of Comparative Example 1 was prepared.

COMPARATIVE EXAMPLE 2

The procedure of Example 1 was repeated, except that the resin for the first resin layer, the resin for the second resin layer, and the resin for the third resin layer in Example 1 were changed as shown in Table 2, that is, the first and third resin layers were two-component cured urethane resin layers and the second resin layer was a thermoplastic resin layer. Thus, a decorative material of Comparative Example 2 was prepared.

COMPARATIVE EXAMPLE 3

The procedure of Example 1 was repeated, except that the resin for the first resin layer, the resin for the second resin layer, and the resin for the third resin layer in Example 1 were changed as shown in Table 2, that is, all the first to third resin layers were thermoplastic resin layers. Thus, a decorative material of Comparative Example 3 was prepared.

COMPARATIVE EXAMPLE 4

The procedure of Example 1 was repeated, except that the resin for the first resin layer, the resin for the second resin layer, and the resin for the third resin layer in Example 1 were changed as shown in Table 2, that is, all the first to third resin layers were thermoplastic resin layers. Thus, a decorative material of Comparative Example 4 was prepared.

COMPARATIVE EXAMPLE 5

The procedure of Example 1 was repeated, except that the resin for the first resin layer, the resin for the second resin layer, and the resin for the third resin layer in Example 1 were changed as shown in Table 2, that is, all the first to third resin layers were thermoplastic resin layers. Thus, a decorative material of Comparative Example 5 was prepared.

TABLE 2

Formulations of coating liquids for resin layers

| | 1st resin layer | 2nd resin layer | 3rd resin layer |
|---|---|---|---|
| Ex. 1 | A/B = 5/5 + C:3% | A/B = 5/5 | A/B = 5/5 + C:3% |
| Ex. 2 | A/B = 5/5 + C:5% | A/B = 5/5 | A/B = 5/5 + C:3% |
| Ex. 3 | A/B = 5/5 + C:5% | A/B = 5/5 | A/B = 5/5 + C:5% |
| Ex. 4 | A/B = 7/3 + C:3% | A/B = 5/5 | A/B = 5/5 + C:3% |
| Ex. 5 | A/B = 7/3 + C:3% | A/B = 5/5 | A/B = 7/3 + C:3% |
| Ex. 6 | A/B = 4/6 + C:3% | A/B = 5/5 | A/B = 5/5 + C:3% |
| Ex. 7 | A/B = 4/6 + C:3% | A/B = 5/5 | A/B = 4/6 + C:3% |
| Ex. 8 | A/B = 6/4 + C:3% | A/B = 5/5 | A/B = 5/5 + C:3% |
| Ex. 9 | A/B = 6/4 + C:3% | A/B = 5/5 | A/B = 6/4 + C:3% |
| Ex. 10 | A/B = 5/5 + C:3% | A/B = 5/5 | A/B = 5/5 + C:3% |
| Comp. Ex. 1 | A/B = 5/5 + C:5% | Nitrocellulose resin only | A/B = 5/5 + C:5% |
| Comp. Ex. 2 | A/B = 5/5 + C:5% | Acrylic resin only | A/B = 5/5 + C:5% |
| Comp. Ex. 3 | Acrylic resin only | Nitrocellulose resin only | Acrylic resin only |
| Comp. Ex. 4 | Acrylic resin only | Acrylic resin only | Nitrocellulose resin only |
| Comp. Ex. 5 | A/B = 5/5 | A/B = 5/5 | A/B = 5/5 |

Note)
A: Unsaturated polyester polyol
B: (Saturated) polyester elastomer polyol
C: 1,6-Hexamethylene diisocyanate The decorative materials of the examples and comparative examples were evaluated for surface properties. The results were as shown in Table 3. As is apparent from Table 3, all the decorative materials of the examples of the present invention were good in all of staining resistance, solvent resistance, marring resistance (scratch resistance), abrasion resistance, and anti-transferability to a cellophane pressure-sensitive adhesive tape. Further, as is apparent from Examples 1 to 9, the effect of the present invention could be obtained when the substrate was not impregnated paper but a paper material. Therefore, low-cost decorative materials can be provided. On the other hand, for the decorative materials of the comparative examples wherein at least one of the first to third resin layers was outside the scope of the present invention, all the surface properties could not be simultaneously satisfied although a part of the surface properties was satisfactory.

mirror surface layer, the scratch resistance was evaluated in terms of marring resistance which is resistance to scratch against a mirror surface. The marring resistance (and scratch resistance) was determined by measuring a load necessary for removing the color in the two-component cured urethane resin layer with a Hoffmann scratch testing machine (BYK Gardner Inc.). When the load was not less than 3.0 N, the marring resistance was evaluated as good (○); and when the load was less than 3.0 N, the marring resistance was evaluated as failure (×)

(D) Abrasion resistance: The abrasion resistance was measured according to Abrasion Test C in JIS. Specifically, the surface resin layer of the decorative material was subjected to an abrasion test using two soft truck wheels at a load of 9.81 N (1 kgf) to measure the number of times

TABLE 3

Evaluation results of surface properties

|  | Staining resistance | Solvent resistance | Marring resistance | Abrasion resistance | Anti-transferability to a cellophane pressure-sensitive adhesive tape |
|---|---|---|---|---|---|
| Ex. 1 | ○ | ○ | ○ (3.43) | ○ (850) | ○ (100/100) |
| Ex. 2 | ○ | ○ | ○ (3.92) | ○ (850) | ○ (100/100) |
| Ex. 3 | ○ | ○ | ○ (3.92) | ○ (900) | ○ (100/100) |
| Ex. 4 | ○ | ○ | ○ (3.43) | ○ (850) | ○ (100/100) |
| Ex. 5 | ○ | ○ | ○ (3.43) | ○ (800) | ○ (100/100) |
| Ex. 6 | ○ | ○ | ○ (3.19) | ○ (850) | ○ (100/100) |
| Ex. 7 | ○ | ○ | ○ (3.43) | ○ (850) | ○ (100/100) |
| Ex. 8 | ○ | ○ | ○ (3.43) | ○ (800) | ○ (100/100) |
| Ex. 9 | ○ | ○ | ○ (3.43) | ○ (850) | ○ (100/100) |
| Ex. 10 | ○ | ○ | ○ (4.41) | ○ (1200) | ○ (100/100) |
| Comp. Ex. 1 | ○ | ○ | X (2.70) | X (600) | ○ (100/100) |
| Comp. Ex. 2 | ○ | ○ | X (2.70) | X (650) | ○ (100/100) |
| Comp. Ex. 3 | X | X | X (1.96) | X (400) | X (60/100) |
| Comp. Ex. 4 | X | X | X (1.96) | X (350) | X (60/100) |
| Comp. Ex. 5 | X | X | X (2.21) | X (600) | X (50/100) |

Note)
Numeric value in parentheses in marring resistance indicates load value (N).
Numeric value in parentheses in abrasion resistance indicates the number of times.
Numeric value in parentheses in anti-transferability to cellophane pressure-sensitive adhesive tape indicates number of squares remaining unpeeled/total number of squares.

The surface properties were evaluated as follows.

(A) Staining resistance: The staining resistance was evaluated according to Contamination Test A in JIS. Specifically, a salad oil was dropped on the surface of the surface resin layer in the decorative material, and the decorative material was then allowed to stand for 24 hr. The decorative material was then visually inspected for the state of the residual contaminant. When the color of the decorative material was changed to a wet color by the contaminant, the staining resistance was evaluated as failure (×); and when the appearance of the decorative material remained unchanged, the staining resistance was evaluated as good (○).

(B) Solvent resistance: The surface of the surface resin layer in the decorative material was rubbed by reciprocating a gauze, impregnated with methyl ethyl ketone, 200 times at a load of 0.981 N (100 gf) on the surface of the surface resin layer, and the decorative material was then visually inspected for a change in appearance of the surface resin layer caused by the solvent. When the appearance of the decorative material remained unchanged, the solvent resistance was evaluated as good (○); and when there was a change in appearance of the decorative material, the solvent resistance was evaluated as failure (×).

(C) Marring resistance (scratch resistance): In the examples, since the surface resin layer was formed as a necessary for the half of the color to be removed. When the number of times was not less than 700 times, the abrasion resistance was evaluated as good (○); and when the number of times was less than 700 times, the abrasion resistance was evaluated as failure (×).

(E) Anti-transferability to cellophane pressure-sensitive adhesive tape: The decorative material was bonded with a urea emulsion adhesive to a 10 mm-thick particle board so that the surface resin layer became the outermost surface layer. Thus, a decorative plate was prepared. Cuts having a depth, which reached the substrate, were vertically and laterally provided in the surface by means of a cutter knife at intervals of 2 mm to form cross-cuts, thereby forming 100 squares (in total; 10 squares in lengthwise direction×10 squares in lateral direction). A cellophane pressure-sensitive adhesive tape (Cello-Tape (registered trademark), manufactured by Nichiban Co., Ltd., width 24 mm, for industrial applications) was then applied to the squares, and was then peeled off by a hand, and the decorative plate was inspected for peel (separation) of the surface resin layer and the first to third resin layers on the substrate. When even one square was separated (not more than 99/100), the anti-transferability to a cellophane pressure-sensitive adhesive tape was evaluated as failure (×); and when no square was separated (100/100), the anti-transferability to a cellophane pressure-sensitive adhesive tape was evaluated as good (○).

The decorative material according to the present invention can realize excellent surface properties, such as excellent staining resistance, marring resistance, scratch resistance, abrasion resistance, and anti-transferability to a cellophane pressure-sensitive adhesive tape, at low cost. Further, the use of a two-component system of an unsaturated polyester polyol and a saturated polyester elastomer polyol as a polyol component for the two-component cured urethane resin layer provided between the substrate and the surface resin layer can further improve surface properties such as marring resistance, scratch resistance, and abrasion resistance. The incorporation of silicone (meth)acrylate in the ionizing radiation curable resin for the surface resin layer can surely realize better anti-transferability to a cellophane pressure-sensitive adhesive tape.

What is claimed is:

1. A decorative material comprising: a substrate having at least on its surface an active hydrogen-containing polar functional group; and, provided on the substrate, a two-component cured urethane resin layer and a surface resin layer of a crosslinked coating formed from an ionizing radiation curable acrylate resin, said two-component cured urethane resin layer comprising at least a first resin layer, a second resin layer, and a third resin layer provided in that order from the substrate side, the crosslinking density of the second resin layer being lower than that of the first resin layer and that of the third resin layer.

2. The decorative material according to claim 1, wherein the two-component cured urethane resin layer comprises a polyol component comprising an unsaturated polyester polyol and a saturated polyester elastomer polyol.

3. The decorative material according to claim 1, wherein the surface resin layer comprises silicone (meth)acrylate.

4. The decorative material according to claim 1, wherein at least one of the at least first, second, and third resin layers within the two-component cured urethane resin layer functions as a decorative layer.

5. The decorative material according to claim 1, wherein any layer of the at least first, second, and third resin layers within the two-component cured urethane resin layer functions as a sealer layer.

6. The decorative material according to claim 1, wherein the active hydrogen-containing polar functional group is a hydroxyl, carboxyl, or amino group.

7. The decorative material according to claim 1, wherein an isocyanate within the two-component cured urethane resin layer is an aliphatic isocyanate.

8. The decorative material according to claim 1, wherein the thickness of each layer within the two-component cured urethane resin layer is 1 to 5 $\mu$m.

9. The decorative material according to claim 1, wherein the thickness of the surface resin layer is 1 to 30 $\mu$m.

10. The decorative material according to claim 1, wherein the surface resin layer has been formed using an ionizing radiation curable resin comprising an acrylate containing it its molecule (meth)acryloyl, (meth)acryloyloxy or other groups.

* * * * *